United States Patent Office 3,445,346
Patented May 20, 1969

3,445,346
STEAM DISTILLATION OF SOLVENTS WITH URANIUM SALT ADDITION
Pierre Auchapt, Bagnols-sur-Ceze, Bernard Girard, Villeneuve-les-Avignons, and Roger Sautray, Bagnols-sur-Ceze, France, assignors to Commissariat à l'Energie Atomique, Paris, France
No Drawing. Filed Dec. 21, 1964, Ser. No. 420,163
Claims priority, application France, Dec. 31, 1963, 959,013
Int. Cl. B01d 3/38, 3/34, 3/10
U.S. Cl. 203—33
8 Claims

ABSTRACT OF THE DISCLOSURE

The present invention is directed to a process for the purification of solvents by steam distillation which is especially intended for the purpose of purifying and decontaminating solvents of the type employed in the nuclear industry. The process comprises steam distilling the solvent to be purified to which has been added a uranium salt. The salt added is added in such quantity that the total uranium content does not exceed 20 grams of uranium per liter of solvent. The distillation is preferably carried out at 100° to 160° C. and at either atmospheric pressure or at from 50 to 400 millimeters of mercury.

---

A large number of industries make use of solvents or mixtures of solvents for the purpose of carrying out selective extraction processes or separation processes either with or without a change of phase. More particularly, the nuclear industry calls for the use of solvents for the purification or separation of so-called "nuclear" substances. This is the case, for example, of the purification of uranium-bearing solutions, of maximum thorium separation and of separation of plutonium from the aqueous solutions employed for the chemical attack of irradiated fuels.

It is necessary in all cases to recycle the solvents used, there being a number of different reasons for this, the most obvious being the high cost of such products. Moreover, this recycling process entails the need to carry out at more or less close time intervals a purification of the solvent employed which is either degraded or charged with impurities which cannot be reextracted. This is particularly the case in the nuclear industry and more especially in the processing of irradiated fuels in which irradiation of the solvent occurs.

The degradation of the solvent can in fact be the result of hydrolysis reactions and radiolysis reactions. In the case, for example, of tributyl phosphate, the degradation products not only do not have the same specificity as the initial solvent but also have an unfortunate tendency to give rise to the formation of complexes with the impurities, which is highly objectionable when the fission products have a high level of activity.

The method of solvent purification which is most frequently adopted consists in washing with alkaline solutions. This operation is mostly carried out either in mixer-settlers or packed columns. While this process is theoretically economical, the decontamination factor which is thereby made possible remains low and consequently makes it necessary to increase the number of successive purification operations.

Another method of solvent purification consists in the vacuum distillation of the contaminated solvent. This method does in fact make it possible to obtain a very good decontamination factor but is nevertheless attended by one drawback, namely the thermal degradation of the solvent. In order to overcome this drawback, it is advisable to carry out the operation in a high vacuum (2 mm. Hg, for example), but this entails an unnecessary increase in the dimensions of the apparatus and destroys the economy of the process.

A third method of solvent purification combines a good decontamination factor with an almost complete absence of thermal degradation of the solvent: this is the method of purification by steam distillation of the solvent. However, this last-mentioned method is also subject to a disadvantage.

In fact, for a given quantity of steam, the decontamination factor is closely dependent on the percentage of residues and on the quantity of solvent entrained. In order to obtain good decontamination factors, it is essential to operate with relatively high percentages of residues of the order of 10%.

The present invention, which has for its object a process for the purification of solvents by steam distillation makes it possible to overcome the above-mentioned disadvantage.

The process referred-to is characterized in that steam is contacted with the solvent which is to be purified and to which is added a quantity of a uranium salt having a content by weight of uranium which is lower than 20 grams per liter until said solvent has been reduced to a maximum of 2% of its initial volume.

The uranium salt employed is uranyl nitrate or depleted uranyl nitrate.

The steam distillation process is carried out at a temperature within the range of 100° C. to 160° C. and is carried out at atmospheric pressure or under an absolute pressure within the range of 50 to 400 millimeters of mercury.

In accordance with an alternative form, the process entails a preliminary step which consists in carrying out the steam distillation of the solvent until this latter has been reduced to a volume corresponding to 10 to 15% of its initial volume.

This invention is based on the surprising fact that the addition of a uranium salt either to a solvent or a mixture of solvents to be purified by steam distillation considerably increases the total decontamination factor. The examples given hereinafter will serve to illustrate this increase.

The above-mentioned advantage has a beneficial influence on the economy of the process. In fact, according to the method of this invention, in which the solvent or mixture of solvents to be processed receives an addition, prior to purification, of a suitable proportion of a uranium salt, there is obtained by steam distillation a recovery of approximately 98% of the solvent or mixture of solvents treated as well as a very high decontamination factor whereas, under the same conditions, the usual method only permits at most a recovery of the order of 90% of the solvent or mixture of solvents and a decontamination factor which is only just acceptable.

Similarly, in accordance with the alternative form of the method according to the invention, wherein the purification by steam distillation remains conventional until the percentage of residues reaches 10 to 15%, a suitable quantity of uranium salt being subsequently added to said residues which are then re-processed by steam distillation until the percentage of residues reaches 2%, a recovery of 99.7% of the solvent or mixture of solvents is thus obtained together with a total decontamination factor which is considerably higher than that which is permitted by the conventional method wherein approximately 90% of the solvent is recovered.

There will now be described below a number of different examples which are given without implied limitation and which relate to the practical application of the process for the purification of solvents according to the invention. The practical arrangements described must be considered as forming part of this invention, it being understood that any equivalent arrangements could also be employed without thereby departing from the scope of the invention.

The examples hereunder relate to a mixture of solvents consisting of 30% TBP (tributyl phosphate) and 70% dodecane which have served for the extraction of plutonium from an aqueous solution derived from the processing of irradiated fuels.

The process of purification by steam distillation was carried out in the same manner with or without addition of uranium. The following results have been recorded:

EXAMPLE 1

The purification process was performed under a pressure of 100 mm. Hg absolute at a temperature of 105° C. Under these conditions, the total decontamination factor was:
Without addition of uranium:
  70 in respect of a percentage of residues of 8.5%
  60 in respect of a percentage of residues of 6%
With a solvent containing 4 g./l. of uranium:
  580 in respect of a percentage of residues of 8.5%
  500 in respect of a percentage of residues of 6%

EXAMPLE 2

The purification process was carried out under a pressure of 200 mm. Hg absolute at a temperature of 120° C. Under these conditions, the total decontamination factor was:
Without addition of uranium:
  65 in respect of a percentage of residues of 10%
  32 in respect of a percentage of residues of 5%
With a solvent containing 4 g./l. of uranium:
  860 in respect of a percentage of residues of 10%
  400 in respect of a percentage of residues of 5%

These two examples clearly bring out the very considerable increase in the total decontamination factor which is achieved by carrying into effect the first alternative form of the purification process according to the invention, as well as the small percentages of residues. If it is considered that a total decontamination factor of 100 is necessary, it will accordingly be understood that only the process in accordance with the invention permits of a purification which is compatible with low percentages of residues.

The above-mentioned total decontamination factor is not the only factor to be considered in the purification of a solvent for plutonium extraction. In fact, it would serve no purpose to have improved the total decontamination factor if the decontamination factor relative to an active product were considerably decreased by the addition of uranium.

Experience has shown that this is in fact not the case, that only the decontamination factor relative to iodine remains practically unchanged whereas the others are all very considerably increased.

EXAMPLE 3

The purification process was performed under a pressure of 100 mm. Hg absolute at a temperature of 105° C. Under these conditions and in respect of a percentage of residues of 10%, the decontamination factor relative to zirconium-niobium was considerably increased compared with the conventional process without uranium.

In point of fact, in the case of an initial activity of 0.84 curie/ml., the activity of the solvent processed was:
0.08 curie/ml. without addition of uranium undetectable by spectrography with a solvent containing 6 g./l. of uranium.

EXAMPLE 4

The purification process was carried out under a pressure of 200 mm. Hg absolute at a temperature of 120° C. Under these conditions, the decontamination factor relative to ruthenium was:
Without addition of uranium:
  67 in respect of a percentage of residues of 10%
  43 in respect of a percentage of residues of 5%
With a solvent containing 4 g./l. of uranium:
  500 in respect of a percentage of residues of 10%
  450 in respect of a percentage of residues of 5%

EXAMPLE 5

The purification process was carried out under a pressure of 100 mm. Hg absolute at a temperature of 105° F. Under these conditions, the decontamination factor relative to ruthenium was:
Without addition of uranium:
  400 in respect of a percentage of residues of 15%
  280 in respect of a percentage of residues of 7%
  200 in respect of a percentage of residues of 5%
With a solvent containing 4 g./l. of uranium:
  1000 in respect of a percentage of residues of 15%
  800 in respect of a percentage of residues of 7%
  560 in respect of a percentage of residues of 5%

In order to illustrate the alternative form of the process according to the invention, the following example relates to a mixture of solvents composed of 65% TBP (tributyl phosphate) and 35% dodecane which has served for the extraction of plutonium from an aqueous solution derived from the treatment of irradiated fuels. The purification process was carried out in the following manner:

EXAMPLE 6

In a first step, the steam distillation process was carried out without addition of uranium to the mixture of solvents, under a pressure of 200 mm. Hg absolute and at a temperature of 120° C. up to a percentage of residues of 10%;

In a second step, said residues were subjected to a purification by steam distillation at a temperature of 105° C. and under a pressure of 100 mm. Hg absolute, both with and without addition of uranium.

The results were as follows:
Without addition of uranium:
  starting from 65% of residues, the total decontamination factor falls below 100
  at a percentage of residues of 25%, the total decontamination factor is 27 whereas the ruthenium decontamination factor is 45;
  at a percentage of residues of 24%, the total decontamination factor is 24 whereas the ruthenium decontamination factor is 32;
  at a percentage of residues of 16%, the total decontamination factor is 19 whereas theruthenium decontamination factor is 32;
With addition of 7 g./l. of uranium:
  at a percentage of residues of 41%, the total decontamination factor is 950 whereas the ruthenium decontamination factor is 1770;
  at a percentage of residues of 15%, the total decontamination factor is 650 whereas the ruthenium decontamination factor is 1965;
  at a percentage of residues of 9.5%, the total decontamination factor is 580 whereas the ruthenium decontamination factor is 1955.

It might have been expected that, contrary to all the advantages attached to the present invention, the addition of uranium to the solvent to be processed is liable to contaminate the purified solvent. Experience has shown, however, that this is not the case. Accordingly, the addition of uranium in a proportion of 14 g./l. to the solvent to be purified leaves in the solvent treated only a quantity which is less than 0.05 g./l. and which is negligible when this solvent is employed for the extraction of plutonium.

What we claim is:

1. A process for the purification and decontamination of solvents which have been utilized for the selective extraction and purification of nuclear substances which comprises (a) adding to said solvent a uranium salt in such quantity that the total content of uranium is lower than 20 grams per liter of solvent; (b) steam distilling said solvent until the initial volume of said solvent is reduced to a maximum of 2% of its initial volume; and (c) concurrent with said steam distillation, recovering the volume of said solvent which is distilled off.

2. A process as claimed in claim 1, wherein the uranium salt is uranyl nitrate.

3. A process as claimed in claim 1, wherein the steam distillation process is carried out at a temperature within the range of 100° C. to 160° C.

4. A process as claimed in claim 1, wherein the steam distillation process is carried out under an absolute pressure within the range of 50 to 400 millimeters of mercury.

5. A process as claimed in claim 1 entailing a preliminary step which consists in purification of the solvent by steam distillation until the solvent has been reduced to a volume which corresponds to 10 to 15% of its initial volume.

6. A process according to claim 1 wherein the steam distillation is carried out at atmospheric pressure.

7. A process according to claim 1 wherein the solvent is a tributyl phosphate.

8. A process according to claim 1 wherein the tributyl phosphate is mixed with dodecane.

References Cited

UNITED STATES PATENTS 2,990,240   6/1961   Ellison et al. _____ 23—341

OTHER REFERENCES

Steam Stripping TBP–AMSCO Solutions From Non-Volatile Contaminants, May 21, 1961, C. R. Ford et al., p. 3.

Purification of Irradiated TBP by Distillation in Kerosene-type Diluent-Sicilio et al., September 1961, pp. 455–461 of Nuclear Science and Engineering.

Purification of Degraded TBP-Hydrocarbon Diluent Solutions by Distillation, p. 2, February 1962, W. Davis, Jr.

WILBUR L. BASCOMB, JR., *Primary Examiner.*

U.S. Cl. X.R.

23—312, 341; 203—53, 79, 85, 92, 95; 252—301.1